US012749136B2

(12) United States Patent
Toteja

(10) Patent No.: US 12,749,136 B2
(45) Date of Patent: Sep. 29, 2026

(54) MACHINE LEARNING TEACHING METHOD DETERMINATION

(71) Applicant: Savar Toteja, Metuchen, NJ (US)

(72) Inventor: Savar Toteja, Metuchen, NJ (US)

(*) Notice: Subject to any disclaimer, the term of this patent is extended or adjusted under 35 U.S.C. 154(b) by 0 days.

(21) Appl. No.: 18/747,283

(22) Filed: Jun. 18, 2024

(65) Prior Publication Data

US 2025/0384504 A1 Dec. 18, 2025

(51) Int. Cl.
*G06Q 50/20* (2012.01)
*G06N 20/00* (2019.01)

(52) U.S. Cl.
CPC ............ *G06Q 50/20* (2013.01); *G06N 20/00* (2019.01)

(58) Field of Classification Search
CPC ...................................................... G06Q 50/20
See application file for complete search history.

(56) References Cited

U.S. PATENT DOCUMENTS

2012/0063654 A1* 3/2012 Kim ....................... G06Q 50/20 382/128
2015/0243176 A1* 8/2015 Zaslavsky ........... G06F 3/04842 434/322
2019/0050715 A1* 2/2019 Ooi ........................ G06N 3/063
2021/0056467 A1* 2/2021 Panayiotou .............. G06N 3/08
2022/0086394 A1* 3/2022 Marcano Martir .... G09B 5/065
2023/0177633 A1* 6/2023 Chen .................. G06Q 50/2057 705/328
2023/0261894 A1* 8/2023 Srivastava .......... H04L 12/1831 709/204
2024/0046393 A1* 2/2024 Butsch ............... G06Q 50/2057

FOREIGN PATENT DOCUMENTS

IN 202311057710 A * 9/2023
IN 202321053125 A * 10/2023

OTHER PUBLICATIONS

Zoana, Zarin Tassnim, et al. "Application of machine learning in identification of best teaching method for children with autism spectrum disorder." arXiv preprint arXiv:2302.05035 (2023). (Year: 2023).*

* cited by examiner

*Primary Examiner* — Brendan S O'Shea
(74) *Attorney, Agent, or Firm* — KNH LLP

(57) ABSTRACT

Apparatuses, systems, methods, and computer program products are disclosed for machine learning teaching method determination. A method includes processing information associated with an individual diagnosed with a neurodevelopmental disorder using one or more machine learning models. A method includes determining a teaching method for an individual diagnosed with a neurodevelopmental disorder based on processing of information using one or more machine learning models. A method includes displaying, to a user, a determined teaching method on an electronic display screen for a hardware computing device.

20 Claims, 4 Drawing Sheets

MACHINE LEARNING TEACHING METHOD DETERMINATION

FIELD

This invention relates to machine learning and more particularly relates to a machine learning determination of a teaching method for an individual diagnosed with a neurodevelopmental disorder.

BACKGROUND

Parents, educators, and other caretakers for individuals with neurodevelopmental disorders like an autism spectrum disorder (ASD) and/or an attention deficit/hyperactivity disorder (ADHD) may have challenges meeting the needs of the individual and/or selecting effective teaching methods for the individual. For example, individuals with neurodevelopmental disorders may inherently have a spectrum of diverse needs, experiences, and abilities, making it difficult or impossible for even an experienced caretaker, educator, and/or medical professional to correctly select a teaching method for an individual with a neurodevelopmental disorder.

SUMMARY

Apparatuses are presented herein for machine learning teaching method determination. An apparatus, in one embodiment, may include a processor. An apparatus, in certain embodiments, may include a memory storing computer program code executable by a processor to perform operations. An operation, in one embodiment, includes processing information associated with an individual diagnosed with a neurodevelopmental disorder using one or more machine learning models. An operation, in a further embodiment, includes determining a teaching method for an individual diagnosed with a neurodevelopmental disorder based on processing of information using one or more machine learning models. In certain embodiments, an operation includes displaying, to a user, a determined teaching method on an electronic display screen for a hardware computing device.

Computer program products are presented herein for machine learning teaching method determination. A computer program product may store computer program code executable to perform operations. An operation, in one embodiment, may include processing information associated with an individual diagnosed with a neurodevelopmental disorder using one or more machine learning models. An operation, in certain embodiments, may include determining a teaching method for an individual diagnosed with a neurodevelopmental disorder based on processing of information using one or more machine learning models. An operation, in a further embodiment, may include displaying, to a user, a determined teaching method on an electronic display screen for a hardware computing device.

Methods are presented herein for machine learning teaching method determination. A method, in one embodiment, may include processing information associated with an individual diagnosed with a neurodevelopmental disorder using one or more machine learning models. A method, in certain embodiments, may include determining a teaching method for an individual diagnosed with a neurodevelopmental disorder based on processing of information using one or more machine learning models. A method, in a further embodiment, may include displaying, to a user, a determined teaching method on an electronic display screen for a hardware computing device.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
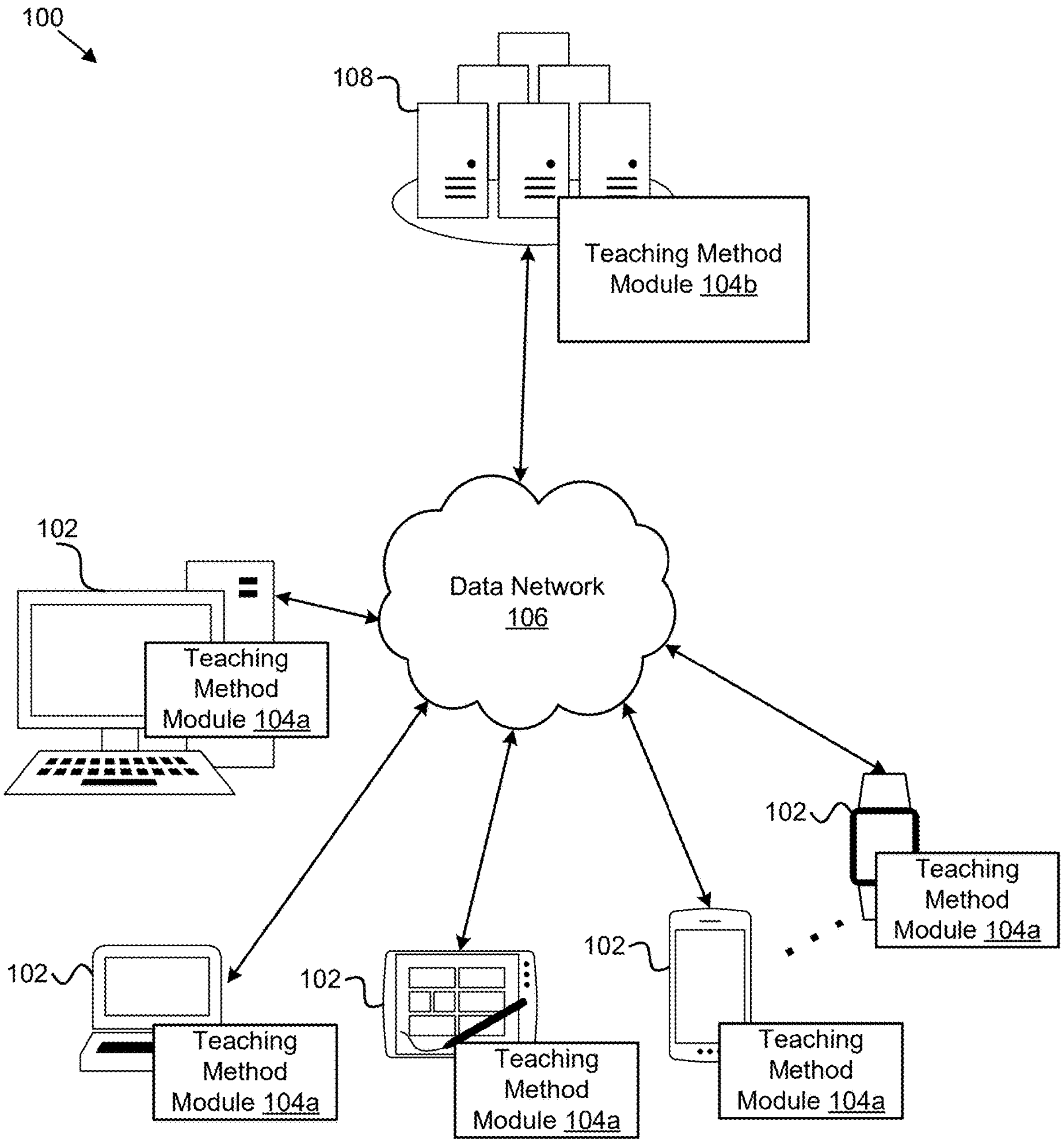
FIG. 1 is a schematic block diagram illustrating one embodiment of a system for machine learning teaching method determination.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

Furthermore, aspects of the present invention may take the form of a computer program product embodied in one or more computer readable medium(s) having program code embodied thereon.

Many of the functional units described in this specification have been labeled as modules (or components), in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible embodiments of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative embodiments, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 depicts one embodiment of a system 100 for machine learning teaching method determination. In one embodiment, the system 100 includes one or more hardware computing devices 102, one or more teaching method modules 104 (e.g., one or more teaching method modules 104*a* disposed on the one or more hardware computing devices 102, one or more backend teaching method modules 104*b*, or the like), one or more data networks 106 or other communication channels, and/or one or more backend server devices 108. In certain embodiments, even though a specific number of hardware computing devices 102, teaching method modules 104, data networks 106, and/or backend server devices 108 are depicted in FIG. 1, one of skill in the art will recognize, in light of this disclosure, that any number of hardware computing devices 102, teaching method modules 104, data networks 106, and/or backend server devices 108 may be included in the system 100 for machine learning teaching method determination.

In general, a teaching method module 104, in various embodiments, is configured to process information associated with an individual diagnosed with a neurodevelopmental disorder using one or more machine learning models, in order to determine a teaching method for the individual, or the like.

Certain neurodevelopmental disorders, such as an autism spectrum disorder (ASD), an attention-deficit/hyperactivity disorder, and/or another disorder may be neurodevelopmental conditions with temporary and/or lifelong effects, with differing severity across a spectrum, or the like. While a precise cause of autism and/or other neurodevelopmental disorders may be unknown, no definitive cure may exist, or the like, timely detection may improve management, facilitating prompt initiation of interventions like behavioral therapies, educational approaches, or the like, which may enhance outcomes. Education for children with neurodevelopmental conditions such as autism remains a challenge, as they often require specialized support and resources, resulting in increasing school dropout rates and subpar academic performance.

Neurodevelopmental disorders such as autism may have extensive variability, with different individuals displaying distinct characteristics. Consequently, educational strategies that are effective for one individual may not be ideal for another, posing a challenge in determining the most suitable teaching method for each child and/or other individual. Due to the diversity of autism spectrum disorder and other neurodevelopmental disorders, an educator, parent/guardian, and/or medical professional may have experience with certain cases and/or types of disorders, such as those in a location and/or other demographic with which they may be familiar, but may have difficulty discerning teaching methods and/or other needs with which they are not yet familiar or for different demographics, introducing human error into diagnosis of neurodevelopmental disorders and/or selection of teaching methods for individuals diagnosed therewith.

A teaching method module 104, may use one or more machine learning models trained on data for individuals from a variety of demographics (e.g., geographic locations, ages, genders, ethnicities, or the like), with a variety of neurodevelopmental disorder diagnoses, with a variety of different teaching methods and/or teaching method efficacies, or the like, from a variety of different educators, parents/guardians, medical professionals, or the like. By using one or more machine learning models, in some embodiments, a teaching method module 104 may enhance a precision of identifying educational methods and/or other requirements for individuals diagnosed with autism and/or other neurodevelopmental disorders, thereby enabling the implementation of more efficient and/or inclusive educational strategies for the individuals.

A teaching method module 104, in one embodiment, may be configured to apply evidence-based practices (EBPs) to develop or otherwise determine a personalized education and/or intervention plan (e.g., a teaching method) for an individual diagnosed with a neurodevelopmental disorder, using one or more machine learning models. A teaching method module 104, an educator, a parent/guardian, or the like may use these plans or other teaching methods, in a further embodiment, in early intervention and/or school-based programs (e.g., to improve outcomes for students or other individuals with autism or the like).

For example, in various embodiments, a teaching method module 104 may process information associated with an individual diagnosed with a neurodevelopmental disorder using one or more machine learning models to determine an optimal and/or effective teaching method for the individual, such as an antecedent-based intervention (e.g., using visual cues to indicate appropriate times for behavior or the like), technology-aided instruction and intervention (TAII) (e.g., computer-assisted instruction or the like), task analysis (e.g., training teachers for inquiry-based science instruction aimed at students with neurodevelopmental disorders or the like), pivotal response training (PRT) (e.g., for enhancing complex social behaviors, language skills, and/or joint attention in children with autism or the like), peer-mediated strategies (e.g., which leverage socially competent peers to model and/or reinforce appropriate behavior to improve social interactions by altering peer expectations and/or promoting peer effort), a picture exchange communication system (PECS) (e.g., to improve social-communicative skills in adaptive behavior and/or unstructured environments or the like, such as for non-verbal individuals with autism and/or another neurodevelopmental disorder), a standard and/or traditional teaching method, or the like.

A teaching method module 104 may process information associated with an individual diagnosed with a neurodevelopmental disorder using one or more machine learning models. For example, a teaching method module 104 may process information such as answers to a questionnaire and/or survey to identify behavioral traits and/or certain characteristics of an individual (e.g., a questionnaire/survey taken by a parent/guardian or other caretaker, an educator, an individual, or the like; one or more questions from the M-CHAT-R and/or other screening test; and/or another questionnaire/survey), freeform text provided by a caretaker for an individual (e.g., describing characteristics of the individual, behavior of the individual, abilities of the individual, or the like), an electronic audio and/or video recording of an individual (e.g., a voice recording, a home video, a recorded appointment with a medical professional, or the like), a drawing and/or other artwork created by an individual, demographic information for an individual (e.g., a geographic location, an age, a gender, an ethnicity, or the like); brain scans, medical history information, or the like; and/or other information associated with an individual.

Based on processing information associated with an individual using one or more machine learning models, in some embodiments, a teaching method module 104 may select and/or otherwise determine a teaching method for the individual. One embodiment of a teaching method includes technology-aided instruction (e.g., utilizing technology to allow an individual to learn at their own pace, providing extra time when needed, or the like). A further embodiment of a teaching method includes an antecedent based intervention (e.g., identifying and/or eliminating one or more factors that may disrupt learning). A teaching method, in one embodiment, includes a pivotal response training (e.g., configured to boost motivation, communication, and/or self-monitoring skills, or the like). In certain embodiments, a teaching method includes peer-mediated instruction (e.g., one or more peers involved in teaching and/or social skill development, or the like). A teaching method, in a further embodiment, includes picture exchange communication (e.g., utilizing visual symbols for communication, or the like). In some embodiments, a teaching method includes task analysis (e.g., breaking down tasks into smaller steps for easier comprehension and/or completion, or the like). A teaching method, in one embodiment, may include a standard teaching method (e.g., in response to a teaching method module 104 determining that an individual does not need specialized education, or the like).

By utilizing one or more machine learning models to determine an individualized teaching method for a user that has been diagnosed with a neurodevelopmental disorder, in some embodiments, a teaching method module 104 may provide a fast, efficient, less expensive, more reliable, more accurate, and/or more effective selection of a teaching method than could an educator, a medical professional, a parent, and/or another caretaker. Further, a teaching method module 104 may be capable of selecting teaching methods for individuals in parts of the world and/or having demographics where little or no expertise with regard to neurodevelopmental disorders may be available and/or affordable. By using one or more customized machine learning models, a teaching method module 104 may personalize teaching methods for individuals based on one or more social, emotional, developmental, and/or environmental factors for each individual, leading to better, more personalized outcomes leveraging a wide variety of specialized expertise across different demographics in the training data for the one or more machine learning models.

The one or more machine learning models, in one embodiment, may include a random forest model (e.g., with a number of trees between about 10 and 100, with a number of trees of about 50, with a depth between about 1 and 7, or the like). The one or more machine learning models, in a further embodiment, may include a multilayer perceptron model (e.g., with a learning rate between about 0.000001 and 0.05, with a number of epochs between about 10 and 50, with a learning rate of about 0.05 and about 50 epochs, with a learning rate of about 0.005, or the like). In some embodiments, the one or more machine learning models may include a K nearest neighbor model (e.g., with a number of points K set between about 1 and 20, K set to about 9, an odd value of K, or the like). The one or more machine learning models, in certain embodiments, may include a decision tree model (e.g., with a maximum depth between about 1 and 7, or the like).

In embodiments where a teaching method module 104 processes information using multiple machine learning models, the teaching method module 104 may combine predictions, teaching methods, and/or other results from the multiple machine learning models to generate a list of one or more teaching methods. In one embodiment, a teaching method module 104 only includes a teaching method in a list of predicted teaching methods in response to each of a plurality of machine learning models predicting the teaching method (e.g., agreeing). In other embodiments, a teaching method module 104 may include a teaching method in a list of predicted teaching methods in response to a majority of machine learning models predicting the teaching method, in response to any one or more machine learning models predicting the side effect, in a round robin manner, in a voting manner, and/or in any other predefined manner. For example, in a further embodiment, a teaching method module 104 may comprise a different machine learning model for different teaching methods, different types or categories of teaching methods, or the like (e.g., different machine learning models may predict different teaching methods and the teaching method module 104 may combine predictions from different machine learning models into a single list, or the like).

The one or more machine learning models may be trained on a combination of datasets across varying demographics and from medical professionals and or educators with a variety of different areas of expertise. The one or more machine learning models may be trained to correlate information associated with an individual (e.g., questionnaire/survey answers, freeform text, electronically recorded audio, electronically recorded video, drawings or other artwork, or the like) to one or more teaching methods most likely to be successful for the individual based on the training data.

In some embodiments, a teaching method module 104 may be configured to retrain one or more machine learning models (e.g., update, replace, supplement, provide context, and/or otherwise adjust the one or more machine learning models) based on received information associated with an individual diagnosed with a neurodevelopmental disorder, outcomes/accuracy of predicted teaching methods over time, or the like. For example, a teaching method module 104 may track progress and/or an effectiveness of a teaching method for an individual over time, tracking how well a predicted teaching method is working, tracking feedback from educators, parents or other caregivers, or the like and may update and/or otherwise retrain one or more machine learning models based on the tracked progress/effectiveness and/or feedback. A teaching method module 104, in certain embodiments, may be configured to use one or more different machine learning models for different demographics, to receive demographic information as an input, and/or to otherwise predict or otherwise determine teaching methods based at least partially on demographic information.

A teaching method module 104, in one embodiment, may be configured to display, to a user (e.g., a parent or other caretaker, a medical professional, an educator, an individual, or the like), a determined teaching method on an electronic display screen for a hardware computing device 102, or the like. For example, a teaching method module 104 may provide a graphical user interface displaying a teaching method (e.g., as part of an executable software application, as part of a web page or other downloadable content, over an application programming interface (API) and/or command line interface (CLI), as a push notification, as a text message, as an email, or the like).

In certain embodiments, a teaching method module 104 may be further configured to select electronic teaching content for an individual diagnosed with a neurodevelopmental disorder based on a determined teaching method, to display the selected electronic teaching content to the individual on an electronic display screen for a hardware computing device 102, or the like. For example, a teaching method module 104 may be integrated with and/or in communication with an educational program and/or platform and may dynamically select and display educational content to implement a determined teaching method electronically for an individual. In this manner, in some embodiments, a teaching method module 104 may dynamically create personalized learning plans based on predictions from one or more machine learning models, to take into account each individual's unique strengths, challenges, preferences, demographics, or the like, ensuring that their educational experience is tailored to their individual needs.

A teaching method module 104 may receive information from a user, from a medical professional evaluating a user, from a computing device 102, from a backend server device 108, over a data network 106, from one or more user interface elements of a hardware computing device 102 and/or a backend server device 108, or the like. For example, a frontend teaching method module 104*a* may be installed as an application or "app" on a hardware computing device 102 that uses a REST (representational state transfer) or other API call to transmit and/or receive information over the internet, a mobile telephone network, or other data network 106 to a backend teaching method module 104*b* installed on a backend server device 108. In another example, a medical professional may have a hardware computing device 102 that is used to record information for a person and transmit the information to a teaching method module 104, or the like. In some embodiments, a teaching method module 104 may be installed on a hardware computing device 102 such that it is not necessary to transmit information for an individual over a data network 106.

In one embodiment, the system 100 includes one or more hardware computing devices 102. The hardware computing devices 102 and/or the one or more backend server devices 108 (e.g., computing devices, information handling devices, or the like) may include one or more of a desktop computer, a laptop computer, a mobile device, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, and/or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, the hardware computing devices 102 are in communication with one or more backend server devices 108 via a data network 106, described below. The hardware computing devices 102, in a further embodiment, are capable of executing various programs, program code, applications, instructions, functions, or the like.

In various embodiments, a teaching method module 104 may be embodied as hardware, software, or some combination of hardware and software. In one embodiment, a teaching method module 104 may comprise executable program code stored on a non-transitory computer readable storage medium for execution on a processor of a hardware computing device 102; a backend server device 108; or the like. For example, a teaching method module 104 may be embodied as executable program code executing on one or more of a hardware computing device 102; a backend server device 108; a combination of one or more of the foregoing; or the like. In such an embodiment, the various modules that perform the operations of a teaching method module 104, as described below, may be located on a hardware computing device 102; a backend server device 108; a combination of the two; and/or the like.

In various embodiments, a teaching method module 104 may be embodied as a hardware appliance that can be installed or deployed on a backend server device 108, on a user's hardware computing device 102 (e.g., a dongle, a protective case for a phone 102 or tablet 102 that includes one or more semiconductor integrated circuit devices within the case in communication with the phone 102 or tablet 102 wirelessly and/or over a data port such as USB or a proprietary communications port, or another peripheral device), or elsewhere on the data network 106 and/or collocated with a user's hardware computing device 102. In certain embodiments, a teaching method module 104 may comprise a hardware device such as a secure hardware dongle or other hardware appliance device (e.g., a set-top box, a network appliance, or the like) that attaches to another hardware computing device 102, such as a laptop computer, a server, a tablet computer, a smart phone, or the like, either by a wired connection (e.g., a USB connection) or a wireless connection (e.g., Bluetooth®, Wi-Fi®, near-field communication (NFC), or the like); that attaches to an electronic display device (e.g., a television or monitor using an HDMI port, a DisplayPort port, a Mini DisplayPort port, VGA port, DVI port, or the like); that operates substantially independently on a data network 106; or the like. A hardware appliance of a teaching method module 104 may comprise a power interface, a wired and/or wireless network interface, a graphical interface (e.g., a graphics card and/or GPU with one or more display ports) that outputs to a display device, and/or a semiconductor integrated circuit device as described below, configured to perform the functions described herein with regard to a teaching method module 104.

A teaching method module 104, in such an embodiment, may comprise a semiconductor integrated circuit device (e.g., one or more chips, die, or other discrete logic hardware), or the like, such as a field-programmable gate array (FPGA) or other programmable logic, firmware for an FPGA or other programmable logic, microcode for execution on a microcontroller, an application-specific integrated circuit (ASIC), a processor, a processor core, or the like. In one embodiment, a teaching method module 104 may be mounted on a printed circuit board with one or more electrical lines or connections (e.g., to volatile memory, a non-volatile storage medium, a network interface, a peripheral device, a graphical/display interface. The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of a teaching method module 104.

The semiconductor integrated circuit device or other hardware appliance of a teaching method module 104, in certain embodiments, comprises and/or is communicatively coupled to one or more volatile memory media, which may include but is not limited to: random access memory (RAM), dynamic RAM (DRAM), cache, or the like. In one embodiment, the semiconductor integrated circuit device or other hardware appliance of a teaching method module 104 comprises and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more backend server devices 108, in one embodiment, may include one or more network accessible computing systems such as one or more web servers hosting one or more web sites, an enterprise intranet system, an application server, an API server, an authentication server, or the like. A backend server device 108 may include one or more servers located remotely from the hardware computing devices 102. A backend server device 108 may include at least a portion of a teaching method module 104, may comprise hardware of a teaching method module 104, may store executable program code of a teaching method module 104 in one or more non-transitory computer readable storage media, and/or may otherwise perform one or more of the various operations of a teaching method module 104 described herein.

In certain embodiments, a plurality of teaching method modules 104 disposed on a plurality of different computing devices 102 may receive data for a plurality of different individuals. For example, a plurality of distributed teaching method modules 104 may collect data samples for an educational study, to train a machine learning model for predicting a teaching method, or the like.

A teaching method module 104, in one embodiment, may store received information on a computer readable storage medium of a computing device 102, 110, so that a teaching method module 104 may access and/or process the received information to predict a teaching method, train a machine learning model for predicting a teaching method, or the like; so that a teaching method module 104 may provide the received information to one or more authorized users; and/or so that the received information is otherwise accessible for use. In another embodiment, a teaching method module 104 may use received information directly for predicting a teaching method (e.g., without otherwise storing the information, temporarily storing and/or caching the information, or the like). A teaching method module 104 may store and/or organize received information in a database and/or other predefined data structure accessible by the teaching method module 104, or the like.

By storing information associated with an individual diagnosed with a neurodevelopmental disorder, in certain embodiments, a teaching method module 104 may dynamically determine a teaching method for the individual. For example, a teaching method module 104 may store information for an individual on a hardware computing device 102, on a backend server device 108 in communication with a hardware computing device 102 over a data network 106, or the like, enabling the teaching method module 104 to determine a teaching method using one or more machine learning models.

In one embodiment, a teaching method module 104 provides one or more users with access to received information, to predicted teaching methods and/or other results from one or more machine learning models, or the like. A teaching method module 104 may allow a user to access received information, predictions and/or other results, or the like from multiple locations (e.g., from a mobile app on a mobile computing device 102, from a web browser of a different computing device 102 accessing a web server of a backend server device 108, or the like).

In certain embodiments, a teaching method module 104 may enforce access control permissions (e.g., for privacy, for security, for HIPAA compliance, or the like) by authenticating users (e.g., with a username and password or other authentication credentials) and providing the users access to information, predictions or other results, or the like based on access control permissions associated with the user.

Figure 2:
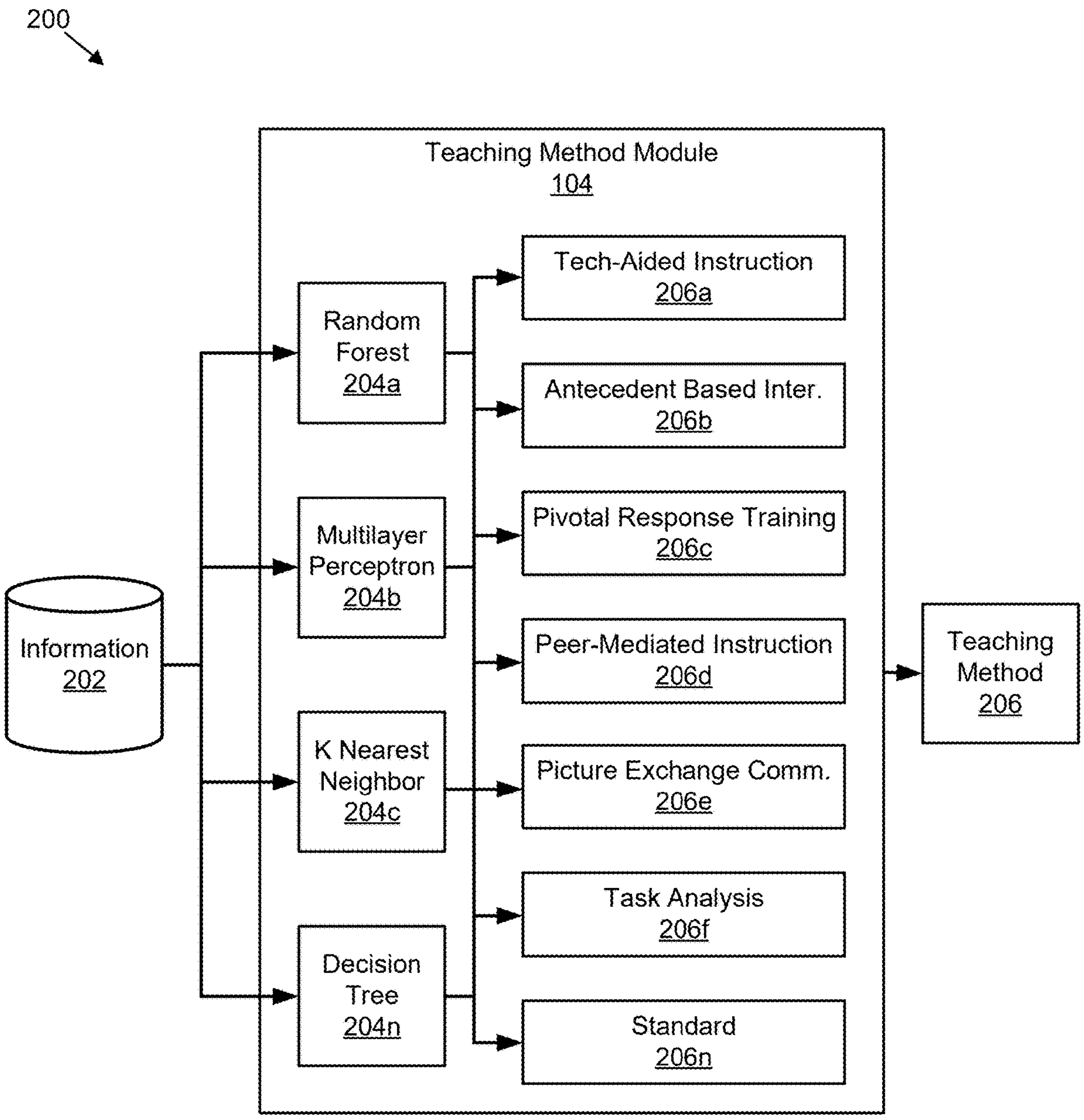
FIG. 2 is a schematic block diagram illustrating a further embodiment of a system for machine learning teaching method determination.

FIG. 2 depicts one embodiment of a system 200 for machine learning teaching method determination. In the depicted embodiment, a teaching method module 104 receives information 202 associated with an individual diagnosed with a neurodevelopmental disorder and processes the information 202 using one or more machine learning models 204*a-n* (e.g., a random forest model 204*a*, a multilayer perceptron model 204*b*, a K nearest neighbor model 204*c*, a decision tree 204*n*, or the like) to determine a teaching method 206*a-n* for the individual. For example, a teaching method module 104 may process information 202 using one or more machine learning models 204*a-n* and based thereon select a teaching method 206 from one or more of technology-aided instruction 206*a*, antecedent based intervention 206*b*, pivotal response training 206*c*, peer-mediated instruction 206*d*, picture exchange communication 206*e*, task analysis 206*f*, and/or standard teaching methods 206*n*, or the like. A teaching method module 104 may display the teaching method 206 to a user on an electronic display screen of a hardware computing device 102, may provide the teaching method 206 over an API in response to an API request, or the like.

Figure 3:
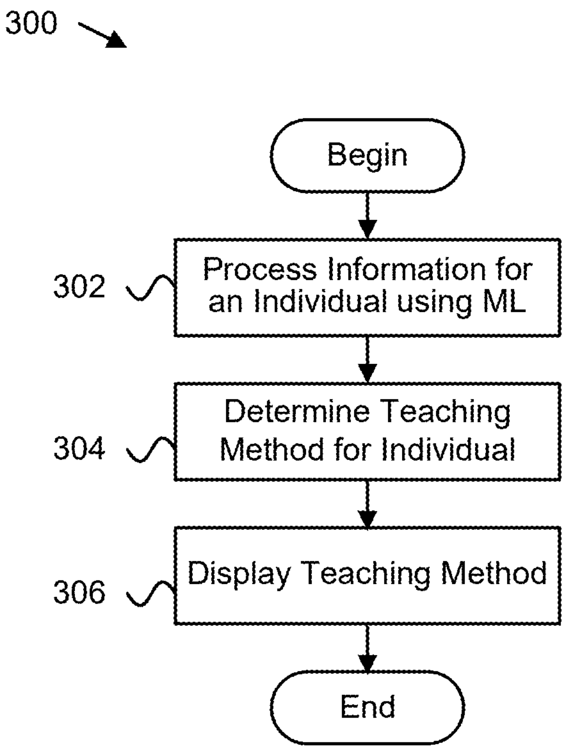
FIG. 3 is a schematic flowchart diagram illustrating one embodiment of a method for machine learning teaching method determination.

FIG. 3 depicts one embodiment of a method 300 for machine learning teaching method determination. The method 300 begins, and a teaching method module 104 processes 302 information 202 associated with an individual diagnosed with a neurodevelopmental disorder using one or more machine learning models 204*a-n*. A teaching method module 104 determines 304 a teaching method 206*a-n* for the individual diagnosed with the neurodevelopmental disorder based on the processing 302 of the information 202 using the one or more machine learning models 204*a-n*. A teaching method module 104 displays 306, to a user, the determined 304 teaching method 206 on an electronic display screen for a hardware computing device 102 and the method 300 ends.

Figure 4:
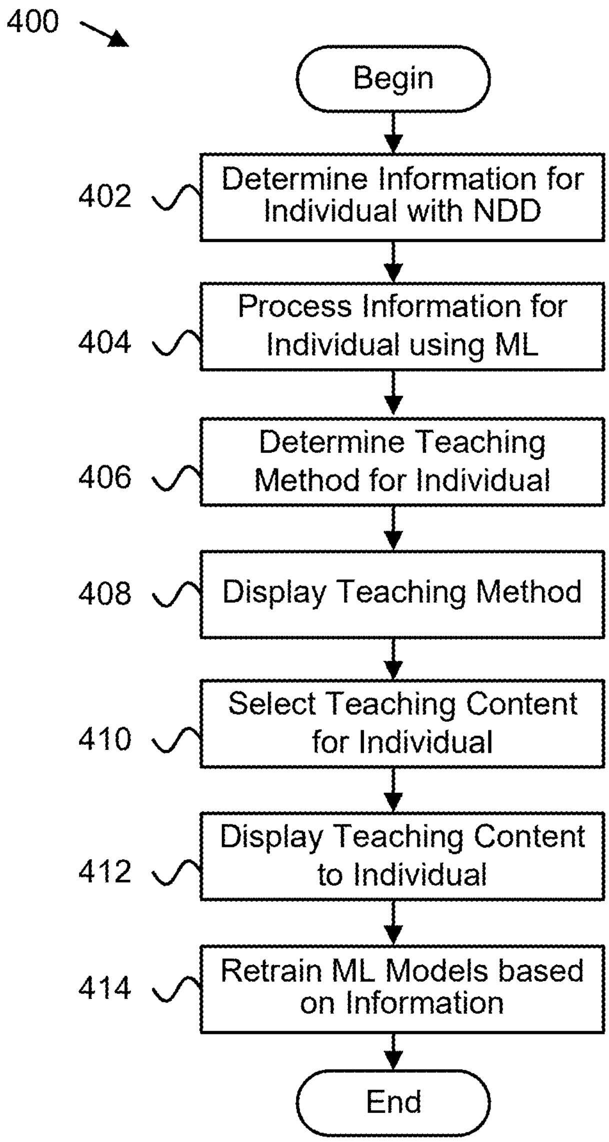
FIG. 4 is a schematic flowchart diagram illustrating a further embodiment of a method for machine learning teaching method determination.

FIG. 4 depicts one embodiment of a method 400 for machine learning teaching method determination. The method 400 begins, and a teaching method module 104 determines 402 information 202 associated with an individual diagnosed with a neurodevelopmental disorder. A teaching method module 104 processes 404 the information 202 associated with the individual diagnosed with the neurodevelopmental disorder using one or more machine learning models 204*a-n*.

A teaching method module 104 determines 406 a teaching method 206*a-n* for the individual diagnosed with the neurodevelopmental disorder based on the processing 404 of the information 202 using the one or more machine learning models 204*a-n*. A teaching method module 104 displays 408, to a user, the determined 406 teaching method 206 on an electronic display screen for a hardware computing device 102.

A teaching method module 104 selects 410 electronic teaching content for the individual diagnosed with the neurodevelopmental disorder based on the determined 406 teaching method 206. A teaching method module 104 displays 412 the selected 410 electronic teaching content to the individual diagnosed with the neurodevelopmental disorder on an electronic display screen for a hardware computing device 102. A teaching method module 104 retrains 414 the one or more machine learning models 204*a-n* based on the information associated with the individual diagnosed with the neurodevelopmental disorder and the method 400 ends.

A means for processing information associated with an individual diagnosed with a neurodevelopmental disorder using one or more machine learning models, in various embodiments, may comprise a teaching method module 104, a random forest model 204*a*, a multilayer perceptron model 204*b*, a K nearest neighbor model 204*c*, a decision tree 204*n*, a hardware computing device 102, a hardware server device 108, a mobile application, a processor, an application specific integrated circuit (ASIC), a field programmable gate array (FPGA), programmable logic, other logic hardware, and/or other executable program code stored on a non-transitory computer readable storage medium. Other embodiments may comprise substantially similar or equivalent means for processing information associated with an individual diagnosed with a neurodevelopmental disorder using one or more machine learning models.

A means for determining a teaching method for an individual diagnosed with a neurodevelopmental disorder based on processing of information using one or more machine learning models, in various embodiments, may comprise a teaching method module 104, a hardware computing device 102, a hardware server device 108, a random forest model 204*a*, a multilayer perceptron model 204*b*, a K nearest neighbor model 204*c*, a decision tree 204*n*, a mobile application, a processor, an application specific integrated circuit (ASIC), a field programmable gate array (FPGA), programmable logic, other logic hardware, and/or other executable program code stored on a non-transitory computer readable storage medium. Other embodiments may comprise substantially similar or equivalent means for determining a teaching method for an individual diagnosed with a neurodevelopmental disorder based on processing of information using one or more machine learning models.

A means for displaying, to a user, a determined teaching method on an electronic display screen for a hardware computing device, in various embodiments, may comprise a teaching method module 104, a hardware computing device 102, a hardware server device 108, an electronic display screen, a mobile application, a processor, an application specific integrated circuit (ASIC), a field programmable gate array (FPGA), programmable logic, other logic hardware, and/or other executable program code stored on a non-transitory computer readable storage medium. Other embodiments may comprise substantially similar or equivalent means for displaying, to a user, a determined teaching method on an electronic display screen for a hardware computing device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:

a processor; and a memory, the memory storing computer program code executable by the processor to perform operations, the operations comprising:

electronically recording an individual diagnosed with a neurodevelopmental disorder, the electronic recording comprising an audio recording of a voice of the individual or a video recording of the individual;

processing multimodal information associated with the individual using a plurality of machine learning models, the multimodal information comprising demographic information, survey responses, and the electronic recording of the individual;

generating a list of one or more teaching methods selected from established evidence-based practices for neurodevelopmental disorders based on a combination of predictions from the plurality of machine learning models, wherein the plurality of machine learning models comprise different machine learning models for predicting different teaching methods, and wherein a teaching method is included in the list of one or more teaching methods in response to a number of the plurality of machine learning models that predict the teaching method satisfying a threshold;

selecting a teaching method for the individual diagnosed with the neurodevelopmental disorder from the list of teaching methods based on a combination of predictions from the plurality of machine learning models, wherein the plurality of machine learning models comprise a plurality of different machine learning models for one or more different demographics, wherein predictions are ranked based on accuracy of past predictions of the respective machine learning model and demographic similarity between training data of the respective machine learning model and the individual, and wherein the teaching method having a highest ranked prediction is selected;

determining a personalized learning plan for the individual based on the predictions from the plurality of machine learning models and the selected teaching method;

receiving access control information from a user for viewing the selected teaching method and the personalized learning plan;

displaying, to the user in response to authenticating the user based on the access control information, the selected teaching method and the personalized learning plan on an electronic display screen for a hardware computing device;

tracking measured effectiveness outcomes associated with the selected teaching method for the individual over time, the measured effectiveness outcomes comprising information indicating an effectiveness of the selected teaching method for the individual diagnosed with the neurodevelopmental disorder; and retraining the plurality of machine learning models using the measured effectiveness outcomes associated with the selected teaching method.

2. The apparatus of claim 1, the operations further comprising:

selecting electronic teaching content for the individual diagnosed with the neurodevelopmental disorder based on the selected teaching method; and displaying the selected electronic teaching content to the individual diagnosed with the neurodevelopmental disorder on an electronic display screen for a hardware computing device.

3. The apparatus of claim 1, wherein the information associated with the individual diagnosed with the neurodevelopmental disorder comprises survey answers provided by a caretaker for the individual.

4. The apparatus of claim 1, wherein the information associated with the individual diagnosed with the neurodevelopmental disorder comprises freeform text provided by a caretaker for the individual.

5. The apparatus of claim 1, wherein the information associated with the individual diagnosed with the neurodevelopmental disorder comprises a drawing created by the individual.

6. The apparatus of claim 1, wherein the information associated with the individual diagnosed with the neurodevelopmental disorder comprises demographic information for the individual.

7. The apparatus of claim 6, wherein the demographic information for the individual diagnosed with the neurodevelopmental disorder comprises an age of the individual.

8. The apparatus of claim 6, wherein the demographic information for the individual diagnosed with the neurodevelopmental disorder comprises one or more of a geographic location, a gender, and an ethnicity for the individual.

9. The apparatus of claim 1, wherein the neurodevelopmental disorder comprises an autism spectrum disorder.

10. The apparatus of claim 1, wherein the neurodevelopmental disorder comprises an attention-deficit/hyperactivity disorder.

11. The apparatus of claim 1, wherein the teaching method comprises one or more of technology-aided instruction, antecedent based intervention, pivotal response training, peer-mediated instruction, picture exchange communication, and task analysis.

12. The apparatus of claim 1, wherein the plurality of machine learning models comprise of a random forest model with a number of trees between 10 and 100 and a depth between 1 and 7, a multilayer perceptron model with a learning rate between 0.000001 and 0.05 and a number of epochs between 10 and 50, a K nearest neighbor model with a number of points K set between 1 and 20, or a decision tree model with a maximum depth between 1 and 7.

13. A computer program product comprising a non-transitory computer readable storage medium storing computer program code executable to perform operations, the operations comprising:

electronically recording an individual diagnosed with a neurodevelopmental disorder, the electronic recording comprising an audio recording of a voice of the individual or a video recording of the individual;

processing multimodal information associated with the individual using a plurality of machine learning models, the multimodal information comprising demographic information, survey responses, and the electronic recording of the individual;

generating a list of one or more teaching methods selected from established evidence-based practices for neurodevelopmental disorders based on a combination of predictions from the plurality of machine learning models, wherein the plurality of machine learning models comprise different machine learning models for predicting different teaching methods, and wherein a teaching method is included in the list of one or more teaching methods in response to a number of the plurality of machine learning models that predict the teaching method satisfying a threshold;

selecting a teaching method for the individual diagnosed with the neurodevelopmental disorder from the list of teaching methods based on a combination of predictions from the plurality of machine learning models, wherein the plurality of machine learning models comprise a plurality of different machine learning models for one or more different demographics, wherein predictions are ranked based on accuracy of past predictions of the respective machine learning model and demographic similarity between training data of the respective machine learning model and the individual, and wherein the teaching method having a highest ranked prediction is selected;

determining a personalized learning plan for the individual based on the predictions from the plurality of machine learning models and the selected teaching method;

receiving access control information from a user for viewing the selected teaching method and the personalized learning plan;

displaying, to the user in response to authenticating the user based on the access control information, the selected teaching method and the personalized learning plan on an electronic display screen for a hardware computing device;

tracking measured effectiveness outcomes associated with the selected teaching method for the individual over time, the measured effectiveness outcomes comprising information indicating an effectiveness of the selected teaching method for the individual diagnosed with the neurodevelopmental disorder; and retraining the plurality of machine learning models using the measured effectiveness outcomes associated with the selected teaching method.

14. The computer program product of claim 13, the operations further comprising:

selecting electronic teaching content for the individual diagnosed with the neurodevelopmental disorder based on the selected teaching method; and displaying the selected electronic teaching content to the individual diagnosed with the neurodevelopmental disorder on an electronic display screen for a hardware computing device.

15. The computer program product of claim 13, wherein the information associated with the individual diagnosed with the neurodevelopmental disorder comprises survey answers provided by a caretaker for the individual.

16. The computer program product of claim 13, wherein the information associated with the individual diagnosed with the neurodevelopmental disorder comprises freeform text provided by a caretaker for the individual.

17. The computer program product of claim 13, wherein the information associated with the individual diagnosed with the neurodevelopmental disorder comprises a drawing created by the individual.

18. The computer program product of claim 13, wherein the information associated with the individual diagnosed with the neurodevelopmental disorder comprises demographic information for the individual.

19. A method comprising:

electronically recording an individual diagnosed with a neurodevelopmental disorder, the electronic recording comprising an audio recording of a voice of the individual or a video recording of the individual;

processing multimodal information associated with the individual using a plurality of machine learning models, the multimodal information comprising demographic information, survey responses, and the electronic recording of the individual;

generating a list of one or more teaching methods selected from established evidence-based practices for neurodevelopmental disorders based on a combination of predictions from the plurality of machine learning models, wherein the plurality of machine learning models comprise different machine learning models for predicting different teaching methods, and wherein a teaching method is included in the list of one or more teaching methods in response to a number of the plurality of machine learning models that predict the teaching method satisfying a threshold;

selecting a teaching method for the individual diagnosed with the neurodevelopmental disorder from the list of teaching methods based on a combination of predictions from the plurality of machine learning models, wherein the plurality of machine learning models comprise a plurality of different machine learning models for one or more different demographics, wherein predictions are ranked based on accuracy of past predictions of the respective machine learning model and demographic similarity between training data of the respective machine learning model and the individual, and wherein the teaching method having a highest ranked prediction is selected;

determining a personalized learning plan for the individual based on the predictions from the plurality of machine learning models and the selected teaching method;

receiving access control information from a user for viewing the selected teaching method and the personalized learning plan;

displaying, to the user in response to authenticating the user based on the access control information, the selected teaching method and the personalized learning plan on an electronic display screen for a hardware computing device;

tracking measured effectiveness outcomes associated with the selected teaching method for the individual over time, the measured effectiveness outcomes comprising information indicating an effectiveness of the selected teaching method for the individual diagnosed with the neurodevelopmental disorder; and retraining the plurality of machine learning models using the measured effectiveness outcomes associated with the selected teaching method.

20. The method of claim 19, further comprising:

selecting electronic teaching content for the individual diagnosed with the neurodevelopmental disorder based on the selected teaching method; and displaying the selected electronic teaching content to the individual diagnosed with the neurodevelopmental disorder on an electronic display screen for a hardware computing device.

* * * * *